United States Patent

Shen et al.

US011861791B2

(10) Patent No.: US 11,861,791 B2
(45) Date of Patent: Jan. 2, 2024

(54) TETRAHEDRAL INTERPOLATION CALCULATION METHOD AND APPARATUS, GAMUT CONVERSION METHOD AND APPARATUS, AND MEDIUM

(71) Applicant: SPREADTRUM COMMUNICATIONS (SHANGHAI) CO., LTD., Shanghai (CN)

(72) Inventors: Jiali Shen, Shanghai (CN); Xiaowei Luo, Shanghai (CN); Fuhuei Lin, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 102 days.

(21) Appl. No.: 17/606,323

(22) PCT Filed: Apr. 13, 2020

(86) PCT No.: PCT/CN2020/084384
§ 371 (c)(1),
(2) Date: Oct. 25, 2021

(87) PCT Pub. No.: WO2020/216085
PCT Pub. Date: Oct. 29, 2020

(65) Prior Publication Data
US 2022/0319113 A1   Oct. 6, 2022

(30) Foreign Application Priority Data

Apr. 25, 2019   (CN) .......................... 201910339312.8

(51) Int. Cl.
*G06T 17/20*   (2006.01)
*G06F 17/17*   (2006.01)
*G06T 15/08*   (2011.01)

(52) U.S. Cl.
CPC .............. *G06T 17/20* (2013.01); *G06F 17/17* (2013.01); *G06T 15/08* (2013.01)

(58) Field of Classification Search
CPC . G06T 17/20; G06T 15/08; G06T 7/90; G06F 17/17
See application file for complete search history.

(56) References Cited

U.S. PATENT DOCUMENTS 5,241,373 A * 8/1993 Kanamori ............ H04N 1/6016
348/E9.037
5,483,360 A * 1/1996 Rolleston ............. H04N 1/6033
358/518

(Continued)

FOREIGN PATENT DOCUMENTS

CN        1882034 A    12/2006
CN      101123080 A    2/2008

(Continued)

OTHER PUBLICATIONS

Kasson, James M., et al. "Performing color space conversions with three-dimensional linear interpolation." Journal of Electronic Imaging 4.3 (1995): 226-250.*

(Continued)

*Primary Examiner* — Sultana M Zalalee
(74) *Attorney, Agent, or Firm* — CANTOR COLBURN LLP (57) ABSTRACT

A tetrahedral interpolation calculation method and apparatus, a gamut conversion method and apparatus, and a medium are provided, the tetrahedral interpolation calculation method comprising: obtaining coordinates of an interpolation point in a sampling space, a side length of a cube formed of nearby eight sampling points surrounding the interpolation point in the sampling space, and mapping values of four vertices of a tetrahedron surrounding the interpolation point, wherein the four vertices are four out of (Continued)

the eight sampling points; calculating a volume of the tetrahedron, and volumes of four sub-tetrahedrons formed of the interpolation point and arbitrary three vertices in the tetrahedron, based on coordinates of the interpolation point in the sampling space, and the side length of the cube formed of nearby eight sampling points surrounding the interpolation point in the sampling space; and obtaining an interpolation value of the interpolation point, based on a tetrahedral interpolation theorem formula, the volume of the tetrahedron, volumes of four sub-tetrahedrons, and mapping values of the four vertices of the tetrahedron.

5 Claims, 8 Drawing Sheets

(56) References Cited

U.S. PATENT DOCUMENTS

| | | | |
|---|---|---|---|
| 6,335,734 B1* | 1/2002 | Nagae | H04N 1/6019 345/589 |
| 6,671,072 B1* | 12/2003 | Nagae | H04N 1/6019 358/1.9 |
| 2001/0040686 A1 | 11/2001 | Schoolcraft et al. | |
| 2004/0109185 A1 | 6/2004 | Hung et al. | |
| 2005/0195233 A1* | 9/2005 | Tanaka | H04N 1/6055 347/15 |
| 2007/0070366 A1* | 3/2007 | Heydinger | H04N 1/6019 358/1.9 |
| 2007/0229532 A1* | 10/2007 | Koyama | G06T 3/4023 345/602 |
| 2013/0321700 A1* | 12/2013 | Cote | H04N 5/213 348/453 |

FOREIGN PATENT DOCUMENTS

| | | |
|---|---|---|
| CN | 109615666 A | 4/2019 |
| CN | 109636912 A | 4/2019 |
| JP | 2006119883 A | 5/2006 |

OTHER PUBLICATIONS

Cuemath, "Tetrahedron—Definition, Properties, Formulas, Examples" [online] https://www.cuemath.com/geometry/tetrahedron/[3/31/2023 12:56:12 PM]).*

Lee, Hak-Sung, Kyung-Seok Kim, and Dongil Han. "A real time color gamut mapping using tetrahedral interpolation for digital tv color reproduction enhancement." IEEE Transactions on Consumer Electronics 55.2 (2009): 599-605.*

EPO Extended Search Report for corresponding EP Application No. 20795272.2; dated Feb. 1, 2022.

Babilon et al., "Strengths and limitations of a uniform 3D-LUT approach for digital camera characterization"; Laboratory of Lighting Technology, 24th Color and Imaging Conference, Technishe University, Nov. 1, 2016; pp. 315-322.

International Search Report for International Application No. PCT/CN2020/084384; dated Jul. 7, 2020.

Re et al., "Color Space Conversion Achieved by an Improved Geometrical Interpolation Algorithm", Microcontrollers & Embedded Systems; Aug. 2018; 4 pages.

* cited by examiner

TETRAHEDRAL INTERPOLATION CALCULATION METHOD AND APPARATUS, GAMUT CONVERSION METHOD AND APPARATUS, AND MEDIUM

CROSS-REFERENCE TO RELATED APPLICATIONS

This is the U.S. national stage of PCT/CN2020/084384, filed on Apr. 13, 2020, Priority under 35 U.S.C. § 119(a) and 35 U.S.C. § 365(b) is claimed from which claims priority to Chinese Patent Application No. 201910339312.8, filed on Apr. 25, 2019, and entitled "TETRAHEDRAL INTERPOLATION CALCULATION METHOD AND APPARATUS, GAMUT CONVERSION METHOD AND APPARATUS, AND MEDIUM", the entire disclosure of which is also incorporated herein by reference.

TECHNICAL FIELD

The present disclosure generally relates to image processing technology field, and more particularly, to a tetrahedral interpolation calculation method and apparatus, gamut conversion method and apparatus, and medium.

BACKGROUND

For a process of color gamut conversion for a RGB data, a variety of interpolation methods can be used, for example, a bicubic interpolation, a triangular prism interpolation, a pyramidal interpolation, or a tetrahedral interpolation. Wherein, the method of tetrahedral interpolation has the highest accuracy, however, with a relatively large amount of calculation.

Usually, for each pixel on an image, a fourth-order matrix determinant formed of homogeneous coordinates of vertices of four tetrahedrons needs to be calculated. Consequently, an apparatus for color gamut conversion adopting a tetrahedral interpolation often has a high time-consuming and power consumption, which cannot meet user requirements.

SUMMARY

Embodiments in the present disclosure provide a method for tetrahedral interpolation calculation.

In an embodiment of the present disclosure, a method for tetrahedral interpolation calculation is provided, the method includes: obtaining coordinates of a interpolation point in a sampling space, a side length of a cube formed of nearby eight sampling points surrounding the interpolation point in the sampling space, and mapping values of four vertices of a tetrahedron surrounding the interpolation point, wherein the four vertices are four out of the eight sampling points; calculating a volume of the tetrahedron, and volumes of four sub-tetrahedrons formed of the interpolation point and arbitrary three vertices in the tetrahedron, based on the coordinates of the interpolation point in the sampling space, the side length of the cube formed of nearby eight sampling points surrounding the interpolation point in the sampling space; and obtaining an interpolation value of the interpolation point, based on a tetrahedral interpolation theorem formula, the volume of the tetrahedron, the volumes of four sub-tetrahedrons, and mapping values of the four vertices of the tetrahedron.

In an embodiment of the present disclosure, a method for color gamut conversion is provided, the method includes: obtaining a particular image and color gamut information of the particular image; selecting a color gamut conversion data corresponding to the color gamut information of the particular image in a preset color gamut conversion database; and performing a color gamut conversion on the particular image according to above method to conduct tetrahedral interpolation calculation to obtain a corresponding color gamut conversion image, based on the color gamut conversion data corresponding to the color gamut information of the particular image.

In an embodiment of the present disclosure, a device including a memory and a processor is provided, wherein the memory has computer instructions stored therein, and when the processor executes the computer instructions, cause the processor to: obtaining coordinates of an interpolation point in a sampling space, a side length of a cube formed of nearby eight sampling points surrounding the interpolation point in the sampling space, and mapping values of four vertices of a tetrahedron surrounding the interpolation point, wherein the four vertices are four out of the eight sampling points; calculating a volume of the tetrahedron, and volumes of four sub-tetrahedrons formed of the interpolation point and arbitrary three vertices in the tetrahedron, based on coordinates of the interpolation point in the sampling space, and the side length of the cube formed of nearby eight sampling points surrounding the interpolation point in the sampling space; and obtaining an interpolation value of the interpolation point, based on a tetrahedral interpolation theorem formula, the volume of the tetrahedron, volumes of four sub-tetrahedrons, and mapping values of the four vertices of the tetrahedron.

DETAILED DESCRIPTION

Figure 1:
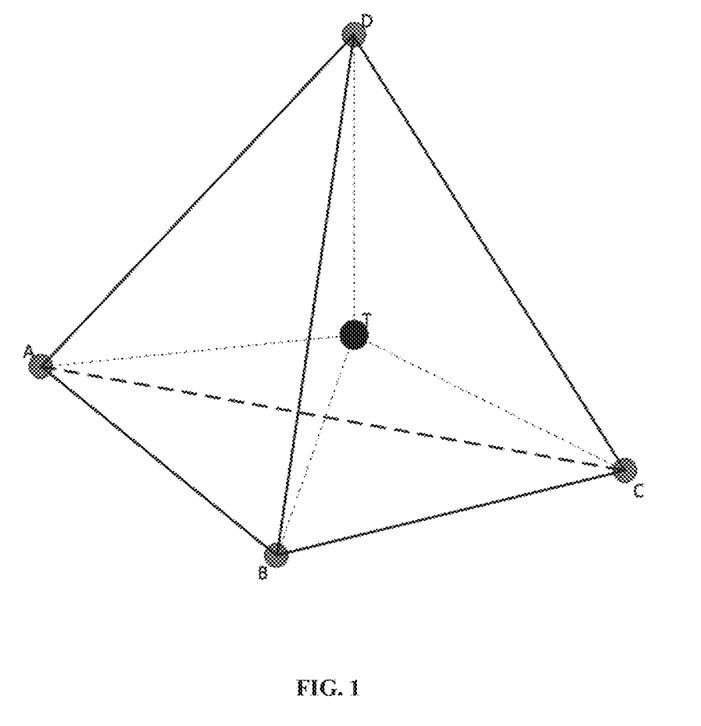
FIG. 1 is a schematic diagram of a conventional tetrahedral interpolation module.

Referring to FIG. 1, a schematic diagram of a conventional tetrahedral interpolation module is shown.

As shown in FIG. 1 and according to a principle of tetrahedral interpolation, four vertices A, B, C, and D of a tetrahedron surrounding an interpolation point T need to be found first. Then, volume $V_{ABCD}$ of tetrahedron ABCD, volume $V_{TABD}$ of sub-tetrahedron TABD, volume $V_{TBCD}$ of sub-tetrahedron TBCD, volume $V_{TABC}$ of a tetrahedron TABC and volume $V_{TACD}$ of a sub-tetrahedron TACD are calculated respectively. Furthermore, weights of the four vertices A, B, C, D are obtained. Finally, value of the interpolation point T is calculated.

A value of an interpolation point T is calculated based on following formula (1), $$D_T = W_A D_A + W_B D_B + W_C D_C + W_D D_D \quad (1)$$

Wherein, $D_T$ represents the value of the interpolation point T, $D_A$, $D_B$, $D_C$ and $D_D$ represent mapping values of four vertices A, B, C and D (in a tetrahedral interpolation calculation, mapping values of four vertices are obtained by a three-dimensional look-up table) respectively, $W_A$, $W_B$, $W_C$ and $W_D$ represent weights of four vertices A, B, C and D respectively, $W_A = V_{TBCD}/V_{ABCD}$, $W_B = V_{TACD}/V_{ASCD}$, $W_C = V_{TABD}/V_{ABCD}$, $W_D = V_{TABC}/V_{ABCD}$.

As shown in FIG. 1, the closer the interpolation point T is to the point A, the larger the volume of sub-tetrahedron TBCD, and the higher the weight of the point A, otherwise, the weight of the point A is lower.

Due to a sum of volumes of the sub-tetrahedron TABD, the sub-tetrahedron TBCD, the sub-tetrahedron TABC and the sub-tetrahedron TACD is equal to a volume of the tetrahedron ABCD. Weights of four vertices A, B, C and D can be calculated based on following formula (2), $$W_A + W_B + W_C + W_D = 1 \quad (2)$$

Based on formula (2), following formula (3) can be obtained to represent a value of an interpolation point T.

$$D_T = (V_{TBCD} D_A + V_{TACD} D_B + V_{TABD} D_C + V_{TABC} D_D)/V_{ABCD} \quad (3)$$

For an irregular tetrahedron, a volume of the tetrahedron is proportional to an absolute value of a matrix determinant formed of homogeneous coordinates of four vertices. Therefore, volume $V_{TABD}$ of sub-tetrahedron TABD, volume $V_{TBCD}$ of sub-tetrahedron TBCD, volume $V_{TABC}$ of sub-tetrahedron TABC, and volume $V_{TACD}$ of sub-tetrahedron TACD can be calculated based on following formulas (4), (5), (6), (7) and (8).

$$|V_{ABCD}| = \frac{1}{6} \text{abs} \left( \begin{vmatrix} x_A & x_B & x_C & x_D \\ y_A & y_B & y_C & y_D \\ z_A & z_B & z_C & z_D \\ 1 & 1 & 1 & 1 \end{vmatrix} \right) \quad (4)$$

$$|V_{TBCD}| = \frac{1}{6} \text{abs} \left( \begin{vmatrix} x_T & x_B & x_C & x_D \\ y_T & y_B & y_C & y_D \\ z_T & z_B & z_C & z_D \\ 1 & 1 & 1 & 1 \end{vmatrix} \right) \quad (5)$$

$$|V_{TACD}| = \frac{1}{6} \text{abs} \left( \begin{vmatrix} x_A & x_T & x_C & x_D \\ y_A & y_T & y_C & y_D \\ z_A & z_T & z_C & z_D \\ 1 & 1 & 1 & 1 \end{vmatrix} \right) \quad (6)$$

$$|V_{TABD}| = \frac{1}{6} \text{abs} \left( \begin{vmatrix} x_A & x_B & x_T & x_D \\ y_A & y_B & y_T & y_D \\ z_A & z_B & z_T & z_D \\ 1 & 1 & 1 & 1 \end{vmatrix} \right) \quad (7)$$

$$|V_{TABC}| = \frac{1}{6} \text{abs} \left( \begin{vmatrix} x_A & x_B & x_C & x_T \\ y_A & y_B & y_C & y_T \\ z_A & z_B & z_C & z_T \\ 1 & 1 & 1 & 1 \end{vmatrix} \right) \quad (8)$$

Formulas (4), (5), (6), (7) and (8) are brought into the formula (3), an interpolation value of the interpolation point T can be obtained.

In the conventional technology, it is necessary to calculate a fourth-order matrix determinant formed of homogeneous coordinates of vertices of four tetrahedrons for each pixel in an image. Consequently, an apparatus for color gamut conversion adopting a tetrahedral interpolation often has a high time-consuming and power consumption, which cannot meet user requirements.

In some embodiment of the present disclosure, based on coordinates of an interpolation point in a sampling space and a side length of a cube formed of nearby eight sampling points surrounding the interpolation point in the sampling space, a volume of a tetrahedron and volumes of four sub-tetrahedrons formed of the interpolation point and arbitrary three vertices in the tetrahedron can be calculated. In embodiments of the present disclosure, there is no need to obtain volumes of four sub-tetrahedrons for each pixel through a fourth-order matrix determinant formed of homogeneous coordinates of vertices of four tetrahedrons. After obtaining coordinates of an interpolation point in a sampling space and side length of a cube formed of nearby eight sampling points surrounding the interpolation point in the sampling space, volumes of four sub-tetrahedrons formed of the interpolation point and arbitrary three vertices in the tetrahedron can be obtained, which greatly reduces an amount for a tetrahedral interpolation calculation.

In order to clarify the object, characteristic and advantages of embodiments of the present disclosure, the embodiments of present disclosure will be described clearly in detail in conjunction with accompanying drawings.

Figure 2:
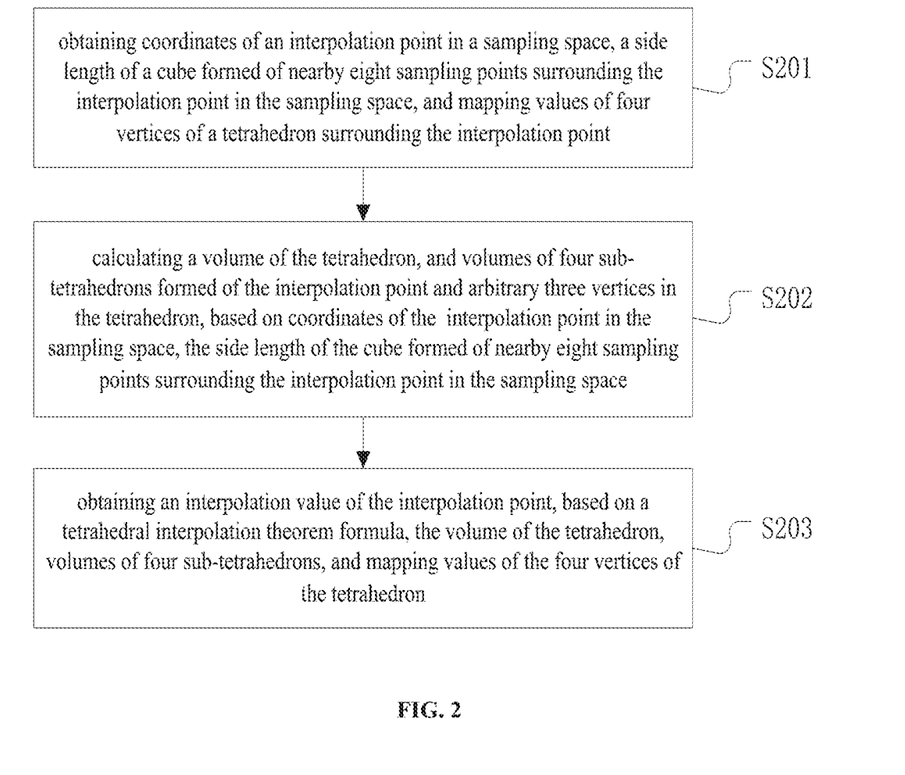
FIG. 2 is a flowchart of a method for tetrahedral interpolation calculation according to an embodiment of the present disclosure.

In an embodiment of the present disclosure, a method for tetrahedral interpolation calculation is provided, referring to FIG. 2, detailed process is described as in S201, S202 and S203.

In S201, coordinates of an interpolation point in a sampling space, a side length of a cube formed of nearby eight sampling points surrounding the interpolation point in the sampling space, and mapping values of four vertices of a tetrahedron surrounding the interpolation point are obtained.

In some embodiment, four vertices are four out of the eight sampling points.

Figure 3:
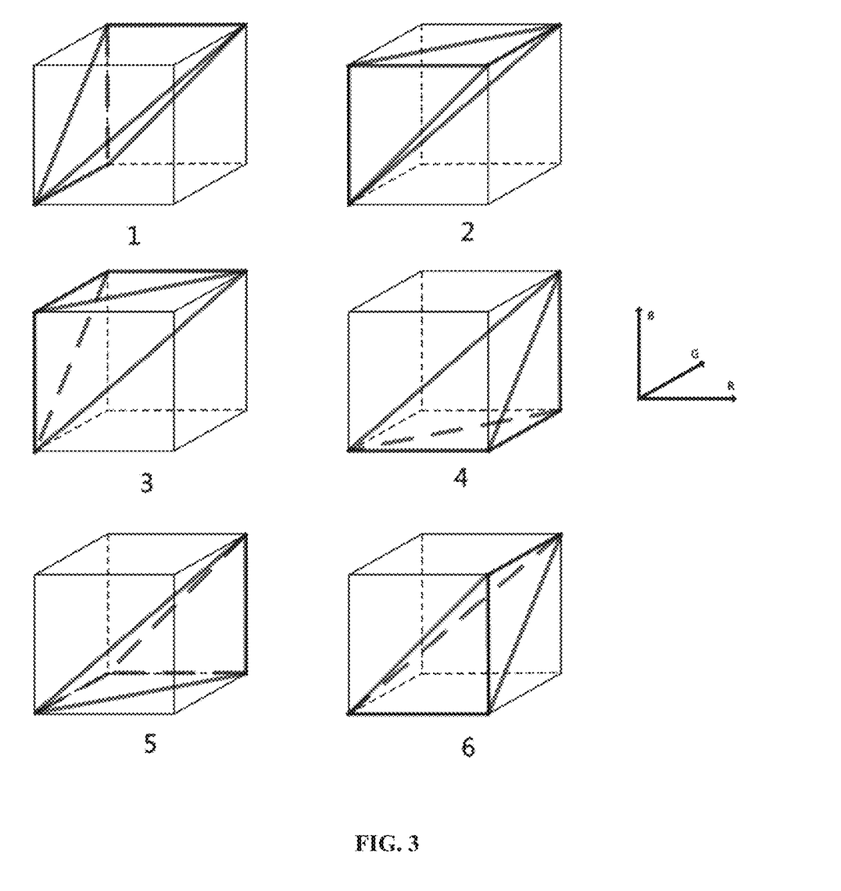
FIG. 3 is a schematic diagram of six ways of segmenting a tetrahedron according to an embodiment of the present disclosure.

Referring to FIG. 3, a schematic diagram of segmenting a tetrahedron in six ways according to an embodiment of the present disclosure is shown in FIG. 3.

In an embodiment of the present disclosure, the sampling space is a three-dimensional space in an RGB standard, and a cube formed of nearby eight sampling points surrounding an interpolation point in the sampling space can be found. It can be seen from FIG. 3 that in the embodiment of the present disclosure, an RGB used for a three-dimensional coordinates axes divides a hexahedron into six different tetrahedrons, tetrahedron 1, tetrahedron 2, tetrahedron 3, tetrahedron 4, tetrahedron 5 and tetrahedron 6 in sequence. Since all sides of the cube are equal in length and the sides are perpendicular to each other, the six tetrahedrons have a same volume and a volume of a tetrahedron is equal to one sixth of the volume of the cube. Volumes of four sub-tetrahedrons can be calculated by a volume formula of a triangular pyramid, that is, multiplying a base area by one third of a height.

In S202, a volume of the tetrahedron and volumes of four sub-tetrahedrons formed of the interpolation point and arbitrary three vertices in the tetrahedron are calculated, based on coordinates of the interpolation point in the sampling space and side length of the cube formed of nearby eight sampling points surrounding the interpolation point in the sampling space.

Figure 4:
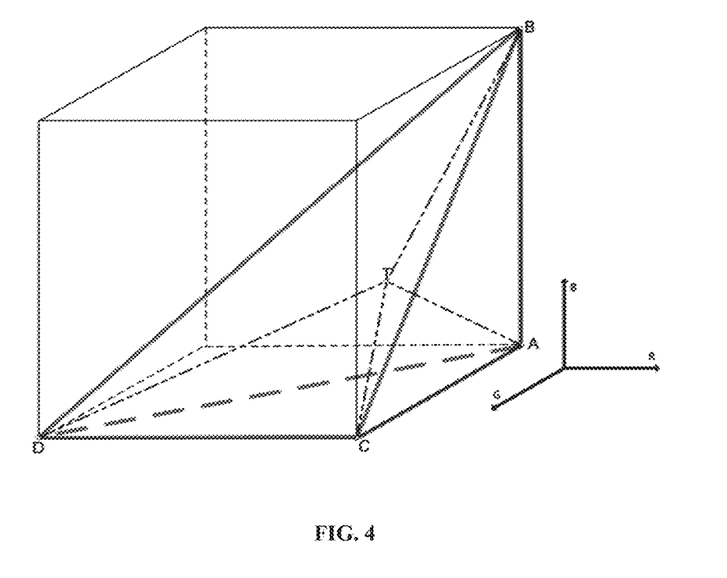
FIG. 4 is a schematic diagram of a tetrahedron structure according to an embodiment of the present disclosure.

Referring to FIG. 4, a tetrahedron obtained by a fourth division as shown in FIG. 3 is taken as an example, a schematic diagram of a tetrahedron structure in an embodiment of the present disclosure is shown.

It can be seen from FIG. 4, tetrahedron ABCD surrounds an interpolation point T. Based on an RGB spatial coordinate axis shown in FIG. 4, relative coordinates of points are obtained as follows: coordinates of point A is A (0, 0, 0), coordinates of point B is B (0, 0, L), and coordinates of point C is C (0, L, 0), coordinates of point D is D (L, L, 0), and coordinates of point T is T (r, g, b), wherein L represents a side length of the cube.

In some embodiment, a volume of the tetrahedron can be calculated based on following formula (9), $$V=L^3/6 \quad (9)$$

Wherein, V represents the volume of the tetrahedron, and L represents the side length of the cube formed of nearby eight sampling points surrounding the interpolation point in the sampling space, that is, a side length of a cube shown in the FIG. 4.

In some embodiment, volumes of four sub-tetrahedrons formed of the interpolation point T and arbitrary three vertices in the tetrahedron are calculated based on following formulas (10), (11), (12) and (13) respectively.

$$V_1=b*S_1/3=b*L^2/6 \quad (10)$$

$$V_2=r*S_2/3=r*L^2/6 \quad (11)$$

$$V_3=h_3*S_3/3=(g-r)*L^2/6 \quad (12)$$

$$V_4=h_4*S_4/3=(L-b-g)*L^2/6 \quad (13)$$

Wherein, $V_1$ represents a volume of a first sub-tetrahedron, (r, g, b) represents coordinates of the interpolation point in the sampling space, $S_1$ represents an area of a triangle formed of three vertices on a same side of the cube, L represents the side length of a cube formed of nearby eight sampling points surrounding the interpolation point in the sampling space, $V_2$ represents a volume of a second sub-tetrahedron, $S_2$ represents an area of a triangle formed of three vertices on another same surface of the cube, $V_3$ represents a volume of a third sub-tetrahedron, $S_3$ represents an area of a triangle formed of three vertices that are not all on a same surface of the cube, $h_3$ represents a distance from the interpolation point to the triangle formed of the three vertices that are not on a same surface of the cube, $h_3=\sqrt{2}*(L-r)-\{L-[g-(L-r)]\}/\sqrt{2}$, $S_3=S_4=\sqrt{2}/2*L^2$, $V_4$ represents a volume of a fourth sub-tetrahedron, $S_4$ represents an area of another triangle formed of three vertices that are not all on a same surface of the cube, and $h_4$ represents a distance from the interpolation point to the another triangle formed of three vertices that are not on a same surface of the cube, $h_4=[L-(b-g)]/\sqrt{2}-\sqrt{2}*g$.

It can be seen from types of six tetrahedrons as divided in FIG. 3, a calculation process of the tetrahedron and four sub-tetrahedrons mentioned above can be applied to an arbitrary divided tetrahedron and four sub-tetrahedrons corresponding to the divided tetrahedron. Thus, sub-tetrahedron TACD constitutes a first sub-tetrahedron, sub-tetrahedron TABC constitutes a second sub-tetrahedron, sub-tetrahedron TABD constitutes a third sub-tetrahedron, sub-tetrahedron TBCD constitutes a fourth sub-tetrahedron; $S_1$ represents an area of triangle ACD, $S_2$ represents an area of triangle ABC, $S_3$ represents an area of triangle ABD, $S_4$ represents an area of triangle BCD.

In S203, an interpolation value of the interpolation point is obtained, based on a tetrahedral interpolation theorem formula, the volume of the tetrahedron, the volumes of four sub-tetrahedrons, and mapping values of the four vertices of the tetrahedron.

In some embodiment, formulas (10), (11), (12), and (13) are brought into the formula (3), and following formula (14) is obtained after simplifying an interpolation value of a point T.

$$D=[D_AL+(D_D-D_C)r+(D_C-D_A)g+(D_B-D_A)b]/L \quad (14)$$

Wherein, D represents the interpolation value of the interpolation point T, $D_A$, $D_B$, $D_C$ and $D_D$ are mapping values of four vertices A, B, C and D of the tetrahedron surrounding the interpolation point T respectively, (r,g,b) represents the coordinates of the interpolation point T in the sampling space, L represents the side length of a cube formed of nearby eight sampling points surrounding the interpolation point in the sampling space, side CD is parallel to X-axis, side CA is parallel to Y-axis, and side BA is parallel to Z-axis.

In some embodiment, for tetrahedrons 1 to 6 as shown in FIG. 3, values of all vertices are substituted into formula (14) based on vertices positions of all tetrahedrons, such that, interpolation values of the interpolation point T corresponding to tetrahedrons can be obtained by different segmenting manners.

In light of above, according to embodiments of the present disclosure, there is no need to obtain volumes of four sub-tetrahedrons for each pixel through a fourth-order matrix determinant formed of homogeneous coordinates of vertices of four tetrahedrons. After obtaining coordinates of an interpolation point in a sampling space and a side length of a cube formed of nearby eight sampling points surrounding the interpolation point in the sampling space, volumes of four sub-tetrahedrons formed of the interpolation point and arbitrary three vertices in the tetrahedron can be obtained, which greatly reduces an amount of a tetrahedral interpolation calculation.

Figure 5:
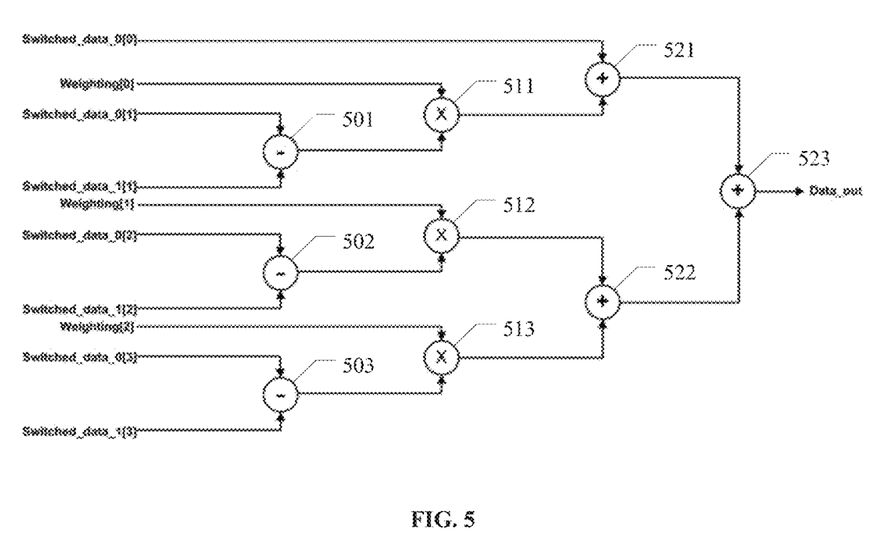
FIG. 5 is a schematic structural diagram of a device for tetrahedral interpolation calculation according to an embodiment of the present disclosure.

Referring to FIG. 5, according to an embodiment of the present disclosure, a device for tetrahedral interpolation calculation is provided, the device includes a first subtractor 501, a second subtractor 502, a third subtractor 503, a first multiplier 511, a second multiplier 512, a third multiplier 513, a first adder 521, a second adder 522, and a third adder 523.

Wherein, for the first subtractor 501, a positive input terminal Switched_data_0[1] is applied with a mapping value of a fourth vertex of a tetrahedron, a negative input terminal Switched_data_1[1] is applied with a mapping value of a third vertex of the tetrahedron, and an output terminal is coupled with a first input terminal of the first multiplier 511.

For the second subtractor 502, a positive input terminal Switched_data_0[2] is applied with the mapping value of the third vertex of the tetrahedron, a negative input terminal Switched_data_1[2] is applied with a mapping value of a first vertex of the tetrahedron, and an output terminal is coupled with a first input terminal of the second multiplier 512.

For the third subtractor 503, a positive input terminal Switched_data_0[3] is applied with a mapping value of a second vertex of the tetrahedron, a negative input terminal Switched_data_1[3] is applied with the mapping value of the first vertex of the tetrahedron, and an output terminal is coupled with a first input terminal of the third multiplier 513.

For the first multiplier 511, a second input terminal Weighting[0] is applied with an X-axis coordinate data of a interpolation point in a sampling space, and an output terminal is coupled with a first input terminal of the first adder 521.

For the second multiplier 512, a second input terminal Weighting[1] is applied with a Y-axis coordinate data of the interpolation point in the sampling space, and an output terminal is coupled with a first input terminal of the second adder 522.

For the third multiplier 513, a second input terminal Weighting[2] is applied with a Z-axis coordinate data of the interpolation point in the sampling space, and an output terminal is coupled with a second input terminal of the second adder 522.

For the first adder 521, a second input terminal Switched_data_0[0] is applied with the mapping value of a first vertex of the tetrahedron, and an output terminal is coupled with a first input terminal of the third adder 523.

For the second adder 522, an output terminal is coupled with a second input terminal of the third adder 523.

For the third adder 523, an output terminal Data_out outputs an interpolation value of the interpolation point.

With reference to FIG. 4 and formula (14), it can be seen that a device for calculating a tetrahedral interpolation provided by an embodiment of the present invention can be used for calculating the interpolation value of tetrahedron ABCD obtained by the fourth division. Wherein, Switched_data_0[1], Switched_data_0[2], and Switched_data_0[3] are applied with $D_D$, $D_C$, and $D_B$ respectively; Switched_data_1[1], Switched_data_1[2], and Switched_data_1[3] are applied with $D_C$, $D_A$, and $D_A$ respectively; Weighting[0], Weighting[1], Weighting[2] are applied with values of r, g, and b in coordinates (r,g,b) of an interpolation point T in a sampling space respectively; Switched_data_0[0] outputs $D_A$, and Data_out is applied with D. Since L represents a preset fixed value, before using the device conducting a tetrahedral interpolation calculation to calculate an interpolation, all input data is preprocessed based on formula (14), so that an accurate interpolation value can be obtained.

In practical applications, through size comparison between an RGB data, it can be determined which type of 6 types of tetrahedrons as classified in FIG. 3 the tetrahedron surrounding the interpolation point T belongs to. Then an order of inputting data can be adjusted to the device for tetrahedral interpolation calculation, to meet a requirement of fast calculation of an interpolation values.

In light of above, according to embodiments of the present disclosure, a tetrahedral interpolation value can be calculated based on three subtractors, three multipliers, and three adders without a plurality of transistor. Hardware cost can be reduced. And since the calculation is simple, a speed of a tetrahedral interpolation calculation can be greatly improved.

Nowadays, multimedia applications such as web browsing, video playing, picture browsing, gaming and entertainment all require a participation of various screens. Furthermore, many types of color spaces are needed when a multimedia content is generated. For example, an sRGB color gamut is used in computer industry, a DCI-P3 color gamut is used in industry of film and television, and an AdobeRGB color gamut is used in an industry of publishing and printing.

Currently, Liquid Crystal Display (LED) screens are mostly used in various devices. However, LCD screens usually have a narrow color gamut and cannot even cover an sRGB color gamut100%, further with a problem of partial color deviation. Consequently, when a content of a standard color gamut is displayed on a LCD screen, an undersaturation and a color cast phenomenon will occur.

In addition, OLED screens which have been gradually put into use in recent years have advantages of high color saturation and high brightness. However, a great deal of wide color gamut screens does not calibrate an original sRGB color gamut. Therefore, when a multimedia content is displayed on a screen, a color gamut mismatch often happens, and causes problems of color distortion including over-saturation and color cast, which seriously affects browsing of multimedia content for users.

In a conventional technology, by adjusting three color channels of RGB independently to reduce or increase three components of R, G and B, a color gamut range of an RGB color space can be adjusted. In that situation, three gains are used to adjust gray levels of three channels. A granularity using this adjustment process is relatively coarse and the adjusted output is often not ideal, which causes poor user experience.

Figure 6:
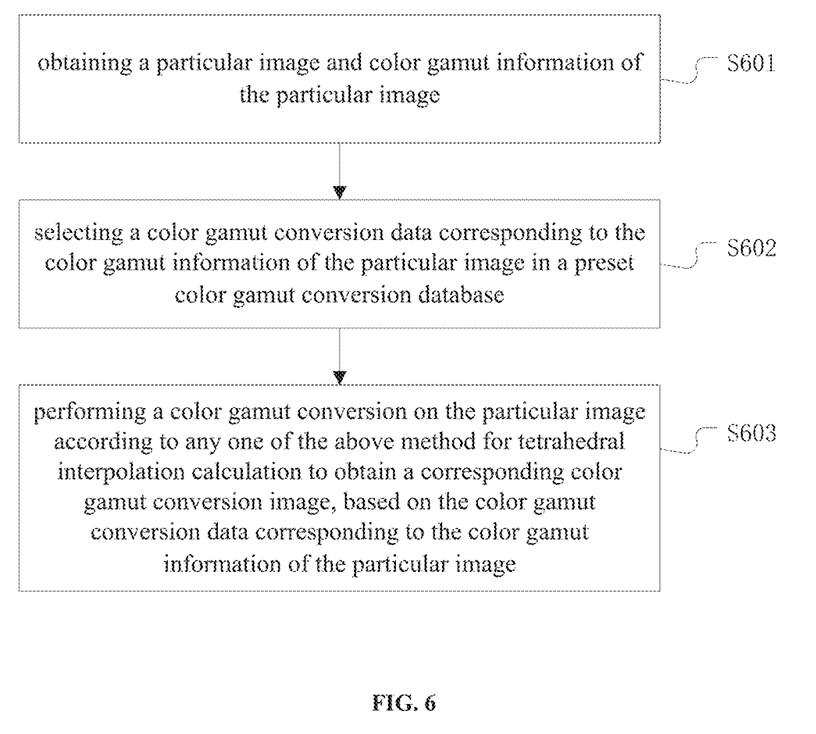
FIG. 6 is a flowchart of a method for color gamut conversion according to an embodiment of the present disclosure.

Accordingly, according to an embodiment of the present disclosure, a method for color gamut conversion is provided. With reference to FIG. 6, a detailed process is described in S601, S602 and S603.

In S601, a particular image and color gamut information of the particular image is obtained.

A color gamut is a complete subset of colors defined by a three-dimensional volume, which is usually described by a bounded volume in a uniform color space. Red, green, and blue (RGB) color space is a standard color space definition which is widely used in computer industry. Currently, color spaces in computer industry all follow the definition of RGB color space, for example, pictures created in an sRGB color gamut and videos with BT.709 format.

In S602, a color gamut conversion data corresponding to the color gamut information of the particular image is selected in a preset color gamut conversion database.

In some embodiment, a color gamut measurement and calibration can be conducted in a color gamut conversion database based on a wide color gamut screen characteristic and a specific color gamut data to obtain at least one color gamut conversion data. The color gamut conversion data may include at least one selected from a group consisting of: an sRGB color gamut conversion data, a DCI-P3 color gamut conversion data and an AdobeRGB color gamut conversion data. It can be understood that a user can choose other color gamut conversion data that meets a color gamut conversion requirement according to their own needs, which is not limited to the above three commonly used color gamuts.

In some embodiment, following processes can be used to select a color gamut conversion data corresponding to a color gamut information of a particular image: performing an address resolution on the color gamut information of the particular image; and looking up the color gamut conversion data corresponding to the color gamut information of the particular image by a three-dimensional look-up table.

In S603, a color gamut conversion on the particular image according to any one of the above method for tetrahedral interpolation calculation is performed to obtain a corresponding color gamut conversion image, based on the color gamut conversion data corresponding to the color gamut information of the particular image.

In some embodiment, a multimedia content usually employs an sRGB color gamut, and a color gamut of a wide color gamut RGB screen is usually larger. Therefore, before displaying a particular image on a wide color gamut RGB screen, a corresponding displayed data needs to be adjusted to adapt to the color gamut of the wide color gamut RGB screen, and to make a color gamut range of the particular image in an RGB color space fall within a color gamut range adjusted by the wide color gamut RGB screen In some embodiment, a data selector can be employed to convert RGB values of all pixels in a particular image into RGB values suitable for a screen. The conversion process can be carried out in the RGB space, and there is no need for conversion again in other color spaces, which increases the speed of converting a color gamut, and can meet the processing speed requirements in many types of equipment.

In some embodiment of the present disclosure, after determining a color gamut conversion data corresponding to the color gamut information of a particular image, an address resolution on an RGB data of a pixel of the particular image can be performed to find a position of the RGB data in three-dimensional look-up table, so that addresses of four vertices of a smallest tetrahedron surrounding the pixel can be found. Then, four addresses of the four vertices are decoded by an address decoder, and data of the four vertices and weights of all vertices are obtained by the three-dimensional look-up table. Thereafter, after data of the four vertices are adjusted during a data sequence adjustment period, the tetrahedral interpolation calculation is performed to obtain an interpolation data of this pixel. Pixel points of the particular image are calculated sequentially to obtain a color gamut conversion image corresponding to the particular image.

According to an embodiment of the present disclosure, based on the color gamut conversion data in the color gamut conversion database, a color gamut for different color gamuts and different screens can be adjusted flexibly based on a color gamut of the particular image, such that a purpose of reducing a color distortion and displaying a multimedia content accurately can be achieved.

Figure 7:
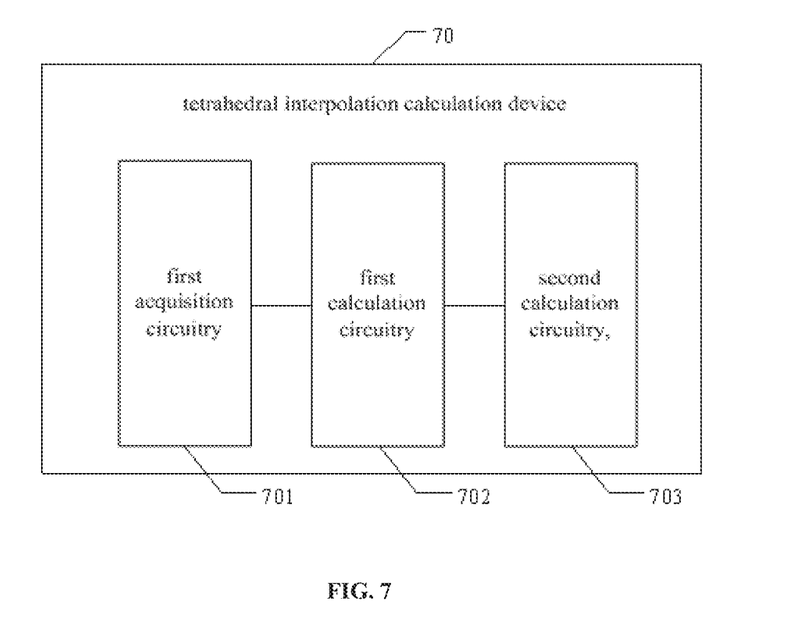
FIG. 7 is a schematic structural diagram of another device for tetrahedral interpolation calculation according to an embodiment of the present disclosure.

Referring to FIG. 7, according to an embodiment of the present disclosure, another device for calculating a tetrahedral interpolation is provided. The device includes: a first acquisition circuitry 701, a first calculation circuitry 702 and a second calculation circuitry 703.

Wherein, the first acquisition circuitry 701 is adapted to obtain coordinates of an interpolation point in a sampling space, a side length of a cube formed of nearby eight sampling points surrounding the interpolation point in the sampling space, and mapping values of four vertices of a tetrahedron surrounding the interpolation point.

The first calculation circuitry 702 is adapted to calculate a volume of the tetrahedron, and volumes of four sub-tetrahedrons formed of the interpolation point and arbitrary three vertices in the tetrahedron, based on the coordinates of the interpolation point in the sampling space, the side length of the cube formed of nearby eight sampling points surrounding the interpolation point in the sampling space.

The second calculation circuitry 703 is adapted to obtain an interpolation value of the interpolation point, based on a tetrahedral interpolation theorem formula, the volume of the tetrahedron, volumes of four sub-tetrahedrons, and the mapping values of the four vertices of the tetrahedron.

In some embodiment, four vertices are four out of eight sampling points

In some embodiment, a first calculation circuitry 702 is adapted to calculate a volume of a tetrahedron based on coordinates of an interpolation point in a sampling space, a side length of a cube formed of nearby eight sampling points surrounding the interpolation point in the sampling space, and the volume of the tetrahedron is calculated based on following formula, $V=L^3/6$, wherein, V represents the volume of the tetrahedron, and L represents the side length of a cube formed of nearby eight sampling points surrounding the interpolation point in the sampling space.

In some embodiment, a first calculation circuitry 702 is adapted to calculate volumes of four sub-tetrahedrons formed of an interpolation point and arbitrary three vertices in a tetrahedron, based on coordinates of the interpolation point in a sampling space, a side length of a cube formed of nearby eight sampling points surrounding the interpolation point in the sampling space, and the volumes of four sub-tetrahedrons formed of the interpolation point and arbitrary three vertices in the tetrahedron can be calculated based on following formulas respectively, $V_1=b*S_1/3=b*L^2/6$, $V_2=r*S_2/3=r*L^2/6$, $V_3=h_3*S_3/3=(g-r)*L^2/6$, $V_4=h_4*S_4/3=(L-b-g)*L^2/6$, wherein $V_1$ represents a volume of a first sub-tetrahedron, (r,g,b) represents the coordinates of the interpolation point in the sampling space, $S_1$ represents an area of a triangle formed of three vertices on one side of the cube, L represents the side length of a cube formed of nearby eight sampling points surrounding the interpolation point in the sampling space, $V_2$ represents a volume of a second sub-tetrahedron, $S_2$ represents an area of a triangle formed of three vertices on another side of the cube, $V_3$ represents a volume of a third sub-tetrahedron, $S_3$ represents an area of a triangle formed of three vertices that are not on a same side of the cube, $h_3$ represents a distance from the interpolation point to the triangle formed of the three vertices that are not on a same side of the cube, $h_3=\sqrt{2}*(L-r)-\{L-[g-(L-r)]\}/\sqrt{2}$, $S_3=S_4=\sqrt{2}/2*L^2$, $V_4$ represents a volume of a fourth sub-tetrahedron, $S_4$ represents an area of another triangle formed of three vertices that are not on a same side of the cube, and $h_4$ represents a distance from the interpolation point to the another triangle formed of the three vertices that are not on a same side of the cube, $h_4=[L-(b-g)]/\sqrt{2}-\sqrt{2}*g$.

In some embodiment, a second calculation circuitry 703 is adapted to obtain an interpolation value of an interpolation point, based on a tetrahedral interpolation theorem formula, a volume of a tetrahedron, volumes of four sub-tetrahedrons and mapping values of four vertices of a tetrahedron volume of the four sub-tetrahedrons, and mapping values of four vertices of the tetrahedron. The interpolation value of the interpolation point can be calculated based on following formula, $D=[D_A L+(D_D-D_C)r+(D_C-D_A)g+(D_B-D_A)b]/L$, wherein, D represents the interpolation value of the interpolation point, $D_A$, $D_B$, $D_C$ and $D_D$ are the mapping values of four vertices A, B, C and D of the tetrahedron surrounding the interpolation point, respectively, (r,g,b) represents the coordinates of the interpolation point in the sampling space, L represents the side length of a cube formed of nearby eight sampling points surrounding the interpolation point in the sampling space, a side CD is parallel to a X-axis, a side CA is parallel to a Y-axis, a side BA is parallel to a Z-axis.

Figure 8:
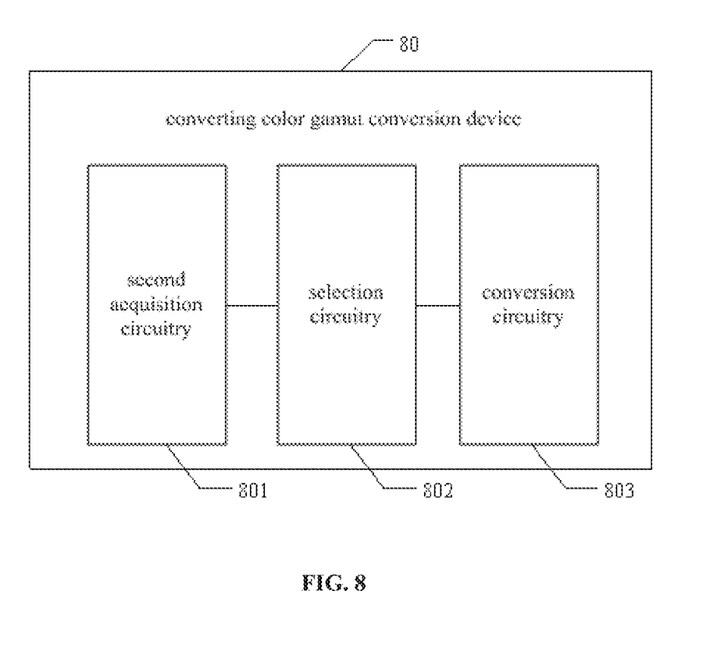
FIG. 8 is a schematic structural diagram of a device for color gamut conversion according to an embodiment of the present disclosure.

Referring to FIG. 8, in an embodiment of the present disclosure, a device for converting color gamut is provided, the device includes: a second acquisition circuitry 801, a selection circuitry 802, a conversion circuitry 803.

Wherein, the second acquisition circuitry 801 is adapted to obtain a particular image and color gamut information of the particular image.

The selection circuitry 802 is adapted to select a color gamut conversion data corresponding to the color gamut information of the particular image in a preset color gamut conversion database.

The conversion circuitry 803 is adapted to performing a color gamut conversion on the particular image by the method for calculating tetrahedral interpolation mentioned above to obtain a corresponding color gamut conversion image, based on the color gamut conversion data corresponding to the color gamut information of the particular image.

In some embodiment, a color gamut conversion database can be obtained by the following processes: performing a color gamut measurement and calibration based on a wide color gamut screen characteristic and a specific color gamut data to obtain at least one color gamut conversion data; the color gamut conversion data includes at least selected from a group consisting of: an sRGB color gamut conversion data, a DCI-P3 color gamut conversion data and an AdobeRGB color gamut conversion data.

In some embodiment, the selection circuitry is adapted to perform an address resolution on a color gamut information of the particular image; and look up a color gamut conversion data corresponding to the color gamut information of the particular image by a three-dimensional look-up table.

In some embodiment, a conversion circuitry 803 may also include an address decoder, which is used to calculate weights of four vertices of a tetrahedron based on positions of points to be interpolated in the tetrahedron.

In an embodiment of the present disclosure, a computer-readable storage medium having computer instructions stored therein is provided, the computer-readable storage medium is a non-volatile storage medium or a non-transitory storage medium, wherein once the computer instructions are executed, the method for tetrahedral interpolation calculation as described above can be performed.

In an embodiment of the present disclosure, a computer-readable storage medium having computer instructions stored therein is provided, the computer-readable storage medium is a non-volatile storage medium or a non-transitory storage medium, wherein once the computer instructions are executed, the method for color gamut conversion as described above can be performed.

In an embodiment of the present disclosure, a device for tetrahedral interpolation calculation comprising a memory and a processor is provided, wherein the memory has computer instructions stored therein, and the method as described above can be performed, once the processor executes the computer instructions.

In an embodiment of the present disclosure, a device for color gamut conversion comprising a memory and a processor is provided, wherein the memory has computer instructions stored therein, and the method as described above can be performed, once the processor executes the computer instructions.

Those skilled in the art can understand that all or part of the processes in the various methods of the above-mentioned embodiments can be completed by a program instructing relevant hardware. The program can be stored in any computer-readable storage medium, and the storage medium may include: ROM, RAM, magnetic disk or CD, etc.

Although the present disclosure is disclosed as above, the present disclosure is not limited to this. Those skilled in the art can make various changes and modifications without departing from the spirit and scope of the present disclosure. Therefore, the protection scope of the present disclosure should be subject to the scope defined by the claims.

What is claimed is:

1. A device comprising a memory and a processor, wherein the memory has computer instructions stored therein, and when the processor executes the computer instructions, cause the processor to:
    obtain coordinates of an interpolation point in a sampling space, a side length of a cube formed of nearby eight sampling points surrounding the interpolation point in the sampling space, and mapping values of four vertices of a tetrahedron surrounding the interpolation point, wherein the four vertices are four out of the eight sampling points;
    calculate a volume of the tetrahedron, and volumes of four sub-tetrahedrons formed of the interpolation point and arbitrary three vertices in the tetrahedron, based on coordinates of the interpolation point in the sampling space, and the side length of the cube formed of nearby eight sampling points surrounding the interpolation point in the sampling space; and
    obtain an interpolation value of the interpolation point, based on a tetrahedral interpolation theorem formula, the volume of the tetrahedron, volumes of four sub-tetrahedrons, and mapping values of the four vertices of the tetrahedron;
        wherein the device further comprises: a first subtractor, a second subtractor, a third subtractor, a first multiplier, a second multiplier, a third multiplier, a first adder, a second adder, and a third adder;
        wherein for the first subtractor, a positive input terminal is applied with a mapping value of a fourth vertex of a tetrahedron, a negative input terminal is applied with a mapping value of a third vertex of the tetrahedron, and an output terminal is applied with a first input terminal of the first multiplier;
    for the second subtractor, a positive input terminal is applied with the mapping value of the third vertex of the tetrahedron, a negative input terminal is applied with a mapping value of a first vertex of the tetrahedron, and an output terminal is applied with a first input terminal of the second multiplier;
    for the third subtractor, a positive input terminal is applied with a mapping value of a second vertex of the tetrahedron, a negative input terminal is applied with the mapping value of the first vertex of the tetrahedron, and an output terminal is applied with a first input terminal of the third multiplier;
    for the first multiplier, a second input terminal is applied with an X-axis coordinate data of an interpolation point in a sampling space, and an output terminal is applied with a first input terminal of the first adder;
    for the second multiplier, a second input terminal is applied with a Y-axis coordinate data of the interpolation point in the sampling space, and an output terminal is applied with a first input terminal of the second adder;
    for the third multiplier, a second input terminal is applied with a Z-axis coordinate data of the interpolation point in the sampling space, and an output terminal is applied with a second input terminal of the second adder;
    for the first adder, a second input terminal is applied with the mapping value of a first vertex of the tetrahedron, and an output terminal is applied with a first input terminal of the third adder;
    for the second adder, an output terminal is applied with a second input terminal of the third adder; and
    for the third adder, an output terminal outputs an interpolation value of the interpolation point.

2. The device according to claim 1, wherein the volume of the tetrahedron is calculated based on following formula, $$V=L^3/6$$

wherein, V represents the volume of the tetrahedron, and L represents the side length of a cube formed of nearby eight sampling points surrounding the interpolation point in the sampling space.

3. The device according to claim 1, wherein volumes of four sub-tetrahedrons formed of the interpolation point and arbitrary three vertices in the tetrahedron are calculated based on following formulas respectively, $$V_1 = b*S_1/3 = b*L^2/6$$

$$V_2 = r*S_2/3 = r*L^2/6$$

$$V_3 = h_3*S_3/3 = (g-r)*L^2/6$$

$$V_4 = h_4*S_4/3 = (L-b-g)*L^2/6$$

wherein, $V_1$ represents a volume of a first sub-tetrahedron, (r, g, b) represents coordinates of the interpolation point in the sampling space, $S_1$ represents an area of a triangle formed of three vertices on a same surface of the cube, L represents the side length of a cube formed of nearby eight sampling points surrounding the interpolation point in the sampling space, $V_2$ represents a volume of a second sub-tetrahedron, $S_2$ represents an area of a triangle formed of three vertices on an another same surface of the cube, $V_3$ represents a volume of a third sub-tetrahedron, $S_3$ represents an area of a triangle formed of three vertices that are not all on a same surface of the cube, $h_3$ represents a distance from the interpolation point to the triangle formed of the three vertices that are not on a same surface of the cube, $h_3 = \sqrt{2}*(L-r) - \{L-[g-(L-r)]\}/\sqrt{2}$, $S_3 = S_4 = \sqrt{2}/2*L^2$, $V_4$ represents a volume of a fourth sub-tetrahedron, $S_4$ represents an area of another triangle formed of three vertices that are not all on a same surface of the cube, and $h_4$ represents a distance from the interpolation point to the another triangle formed of three vertices that are not on a same surface of the cube, $h_4 = [L-(b-g)]/\sqrt{2} - \sqrt{2}*g$.

4. The device according to claim 1, wherein the interpolation value of the interpolation point is calculated based on following formula, $$D = [D_A L + (D_D - D_C) r + (D_C - D_A) g + (D_B - D_A) b]/L$$

wherein, D represents the interpolation value of the interpolation point, $D_A$, $D_B$, $D_C$ and $D_D$ are mapping values of four vertices A, B, C and D of the tetrahedron surrounding the interpolation point respectively, (r, g, b) represents coordinates of the interpolation point in the sampling space, L represents the side length of a cube formed of nearby eight sampling points surrounding the interpolation point in the sampling space, side CD is parallel to X-axis, side CA is parallel to Y-axis, and side BA is parallel to Z-axis.

5. A device for tetrahedral interpolation calculation, comprising:
a first subtractor, a second subtractor, a third subtractor, a first multiplier, a second multiplier, a third multiplier, a first adder, a second adder, and a third adder;
wherein for the first subtractor, a positive input terminal is applied with a mapping value of a fourth vertex of a tetrahedron, a negative input terminal is applied with a mapping value of a third vertex of the tetrahedron, and an output terminal is applied with a first input terminal of the first multiplier;
for the second subtractor, a positive input terminal is applied with the mapping value of the third vertex of the tetrahedron, a negative input terminal is applied with a mapping value of a first vertex of the tetrahedron, and an output terminal is applied with a first input terminal of the second multiplier;
for the third subtractor, a positive input terminal is applied with a mapping value of a second vertex of the tetrahedron, a negative input terminal is applied with the mapping value of the first vertex of the tetrahedron, and an output terminal is applied with a first input terminal of the third multiplier;
for the first multiplier, a second input terminal is applied with an X-axis coordinate data of an interpolation point in a sampling space, and an output terminal is applied with a first input terminal of the first adder;
for the second multiplier, a second input terminal is applied with a Y-axis coordinate data of the interpolation point in the sampling space, and an output terminal is applied with a first input terminal of the second adder;
for the third multiplier, a second input terminal is applied with a Z-axis coordinate data of the interpolation point in the sampling space, and an output terminal is applied with a second input terminal of the second adder;
for the first adder, a second input terminal is applied with the mapping value of a first vertex of the tetrahedron, and an output terminal is applied with a first input terminal of the third adder;
for the second adder, an output terminal is applied with a second input terminal of the third adder; and
for the third adder, an output terminal outputs an interpolation value of the interpolation point.

* * * * *